(12) United States Patent
Sommerville

(10) Patent No.: US 11,421,763 B1
(45) Date of Patent: Aug. 23, 2022

(54) BALL SCREW ACTUATOR FOR ACCOMMODATING MISALIGNMENT

(71) Applicant: Rockford Ball Screw, Rockford, IL (US)

(72) Inventor: Neil Sommerville, Rockford, IL (US)

(73) Assignee: ROCKFORD BALL SCREW, Rockford, IL (US)

(*) Notice: Subject to any disclaimer, the term of this patent is extended or adjusted under 35 U.S.C. 154(b) by 0 days.

(21) Appl. No.: 17/328,386

(22) Filed: May 24, 2021

(51) Int. Cl.
*F16H 25/24* (2006.01)
*F16H 25/22* (2006.01)
*F16H 25/20* (2006.01)

(52) U.S. Cl.
CPC ......... *F16H 25/2204* (2013.01); *F16H 25/24* (2013.01); *F16H 2025/2081* (2013.01); *F16H 2025/2445* (2013.01)

(58) Field of Classification Search
CPC ......... F16H 25/2204; F16H 2025/2445; F16H 2025/2081; F16H 25/24
See application file for complete search history.

(56) References Cited

U.S. PATENT DOCUMENTS

| | | | | |
|---|---|---|---|---|
| 5,797,293 | A  * | 8/1998 | Chaban | F16H 25/24 74/89.36 |
| 7,841,251 | B2 * | 11/2010 | Bogue | F16B 37/00 74/89.42 |
| 11,111,989 | B2 * | 9/2021 | Breton | F16C 19/18 |
| 2009/0277292 | A1 * | 11/2009 | Quarre | G02B 21/26 74/89.23 |
| 2012/0174691 | A1 * | 7/2012 | Yamada | F16H 25/2261 74/89.23 |
| 2012/0192662 | A1 * | 8/2012 | Kluge | F16H 25/2006 74/89.17 |
| 2018/0162550 | A1 * | 6/2018 | Hale | B64D 45/00 |
| 2019/0016364 | A1 * | 1/2019 | Palmer | B62D 1/181 |
| 2019/0293157 | A1 * | 9/2019 | Gou | F16H 25/2015 |
| 2019/0316661 | A1 * | 10/2019 | Parker | F16H 25/24 |
| 2019/0353230 | A1 * | 11/2019 | Kajihara | F16H 25/24 |
| 2020/0172155 | A1 * | 6/2020 | Augustine | F16H 25/2209 |

* cited by examiner

*Primary Examiner* — David M Fenstermacher

(57) ABSTRACT

A linear actuator assembly includes a motor. The linear actuator assembly also includes a ball screw rotatably driven by the motor. The linear actuator assembly further includes a nut coupled to the ball screw and rotationally fixed, the nut translatable along the ball screw upon rotation of the ball screw. The linear actuator assembly yet further includes a flange having a first surface and a second surface, the nut mounted to the first surface and the second surface having a non-planar geometry, the non-planar geometry defined by curvature about an axis from a first side of the flange to a second side of the flange, the first side and the second side of the flange being on opposite sides of the flange from each other.

15 Claims, 6 Drawing Sheets

BALL SCREW ACTUATOR FOR ACCOMMODATING MISALIGNMENT

FIELD OF THE INVENTION

The present invention relates to linear actuators and, more particularly, to a ball screw actuator for accommodating assembly misalignment.

BACKGROUND

This section provides background information related to the present disclosure which is not necessarily prior art.

Components of linear actuators, such as ball screw actuators, may be misaligned relative to each other or to the structural components that they are provided to impart motion to. In a ball screw actuator, a nut is rotationally fixed and in threaded engagement with a lead screw and/or ball screw. As the lead screw is rotated by a motor, the rotational motion of the lead screw is converted to translational motion of the nut, which may be fixed to an additional component to effect translation of the associated component. However, as shown in FIG. 2, if the component(s) that the nut is fixed to is misaligned, relative to the lead screw, the lead screw must flex to some extent to maintain alignment of the nut and ball screw. As the nut is moved closer to the electric motor (i.e., away from the distal end of the lead screw), the flexing capability of the lead screw is more restricted, friction and binding between the nut and screw increased, and operational efficiency is reduced. Additionally, the ball screw actuator may be damaged and the lifespan is reduced.

As can easily be understood, the number of applications in which a ball screw actuator is employed is large. An example of an application that benefits from a ball screw actuator is a passenger boarding bridge of the type used in airport facilities to provide passengers access to parked aircraft without exposing the passengers to the weather and ambient conditions between the parked aircraft and the terminal, as shown in FIG. 1. These bridges are freestanding passenger boarding bridges that are attached or adjacent to the airline terminal at a fixed, but horizontally rotatable, end and will be driven into position at the outboard end of the passenger boarding bridge to interface with a parked aircraft. The aircraft usually accommodated with these bridges are jet aircraft ranging in size from small aircraft to large intercontinental passenger aircraft. The bridges must be vertically adjusted to match the height of the respective doorways of the passenger bridge and the aircraft. An electrically driven ball screw actuator is useful in facilitating the height adjustment of the passenger bridge. However, the same misalignment issues may be present in such applications. Accordingly, addressing this issue would be well received by ball screw actuator manufacturers and manufacturers of systems that employ such actuators, e.g., aircraft passenger bridge manufacturers.

SUMMARY OF THE DISCLOSURE

This section provides a general summary of the disclosure and is not to be interpreted as a complete and comprehensive listing of all of the objects, aspects, features and advantages associated with the present disclosure.

According to one aspect of the disclosure, a linear actuator assembly includes a motor. The linear actuator assembly also includes a ball screw rotatably driven by the motor. The linear actuator assembly further includes a nut coupled to the ball screw and rotationally fixed, the nut translatable along the ball screw upon rotation of the ball screw. The linear actuator assembly yet further includes a flange having a first surface and a second surface, the nut mounted to the first surface and the second surface having a non-planar geometry, the non-planar geometry defined by curvature about an axis from a first side of the flange to a second side of the flange, the first side and the second side of the flange being on opposite sides of the flange from each other.

According to another aspect of the disclosure, a linear actuator assembly includes a motor. The linear actuator assembly also includes a ball screw rotatably driven by the motor. The linear actuator assembly further includes a nut coupled to the ball screw and rotationally fixed, the nut translatable along the ball screw upon rotation of the ball screw. The linear actuator assembly yet further includes a first flange having a first surface and a second surface, the nut mounted to the first surface and the second surface having a radius of curvature about an first axis, the curvature of the second surface curving outwardly from a first side of the first flange to a second side of the first flange, the first side and the second side of the first flange being on opposite sides of the first flange from each other. The linear actuator assembly also includes a spacer having a third surface and a fourth surface, the third surface having an inwardly curved surface corresponding to the second surface of the first flange, the fourth surface having an outwardly curved surface extending from a third side of the spacer to a fourth side of the spacer, the third side and the fourth side being on opposite sides of the spacer from each other.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Example embodiments of the invention will now be described with reference to the accompanying drawings.

However, it is to be understood that the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that some specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, illustrated is a ball screw actuator that is capable of accommodating misalignment of overall system components that the ball screw actuator is driving.

Figure 1:
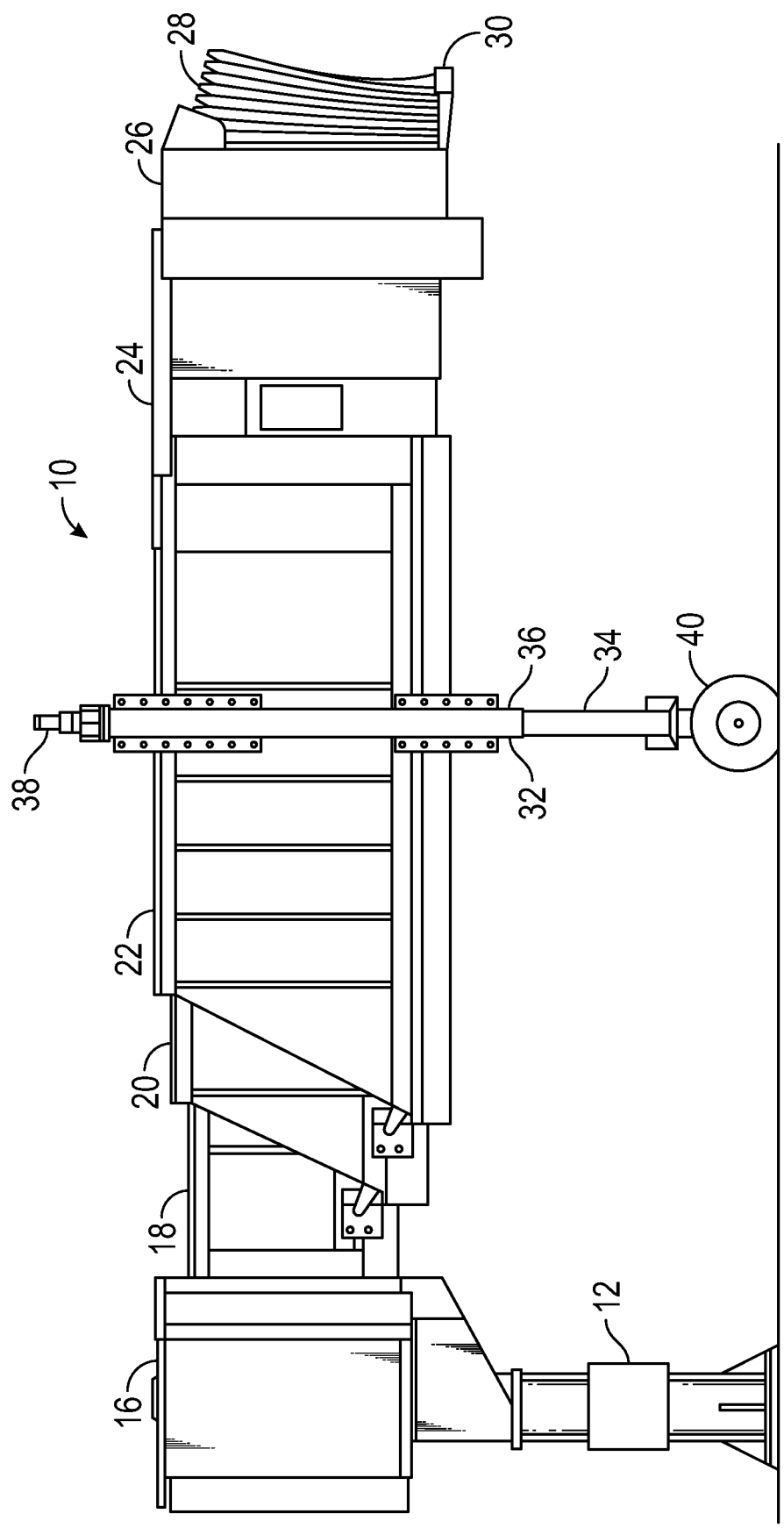
FIG. 1 is a side, elevation view of an aircraft passenger bridge.

FIG. 1 illustrates major components of a passenger boarding bridge that is generally referenced with numeral 10. The passenger boarding bridge 10 is shown in a retracted and elevated position. The bridge 10 is supported on column 12 at the inboard end of the bridge 10, which is the end of the bridge 10 proximate the passenger terminal. The support column 12 pivotally supports an entry vestibule and a rotunda 16. A first tunnel section 18 is connected to the rotunda 16. The first tunnel section 18 is free to pivot and allows tunnel sections 20 and 22 to be elevated or lowered to align with the aircraft passenger access door (not shown). The intermediate tunnel 20 is telescopically carried relative to the first tunnel section 18. The third, or outermost, tunnel section 22 is likewise telescopically carried relative to the intermediate tunnel section 20. At the end of the outermost tunnel 22, a bubble section 24 is carried. The bubble section 24 includes a cab 26, which serves as a portal to the aircraft. The cab section 26 is rotatable on the bubble section 24 to allow appropriate positioning with the aircraft. A weather shielding bellows 28 is one of the outermost components of the passenger boarding bridge 10. The steel frame supported bellows 28 is supported above a floor section that includes a bumper portion 30.

An elevating structure 32, including sets of telescopically associated members 34 and 36, provides the elevation adjustment of the passenger boarding bridge 10. A motor 38 drives a ball screw actuator (not shown in FIG. 1) to provide the adjustment of the telescoping tubes. Each side of the bridge 10 is equipped with the elevating structure, one side of which is shown in FIG. 1. A pair of support wheels, one shown as 40, is mounted to the elevating structure. The wheels are typically driven by an electric motor and allow the bridge 10 to be driven to the airplane. To this point, the passenger boarding bridge 10 shown is typical of the structures well known in the art with the exception of the ball screw actuator that drives the elevating structure 32.

Figure 2:
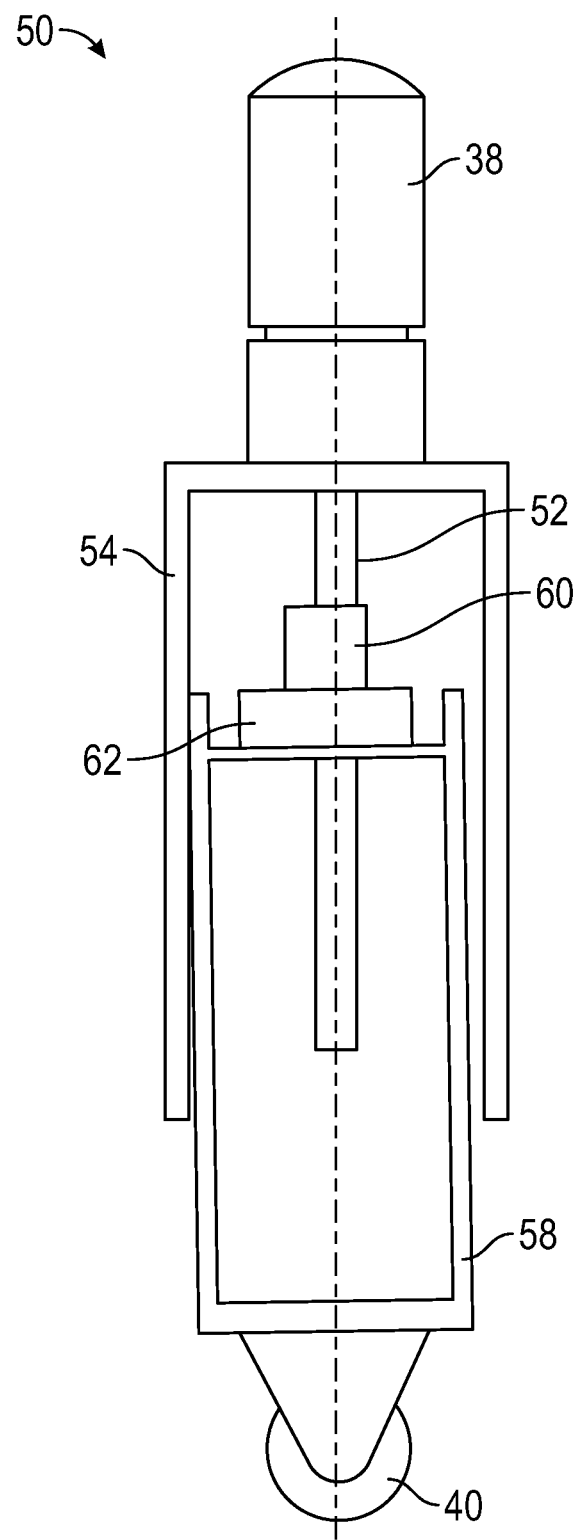
FIG. 2 is a side, elevation view of a ball screw actuator having a fixed planar flange.
Figure 3:
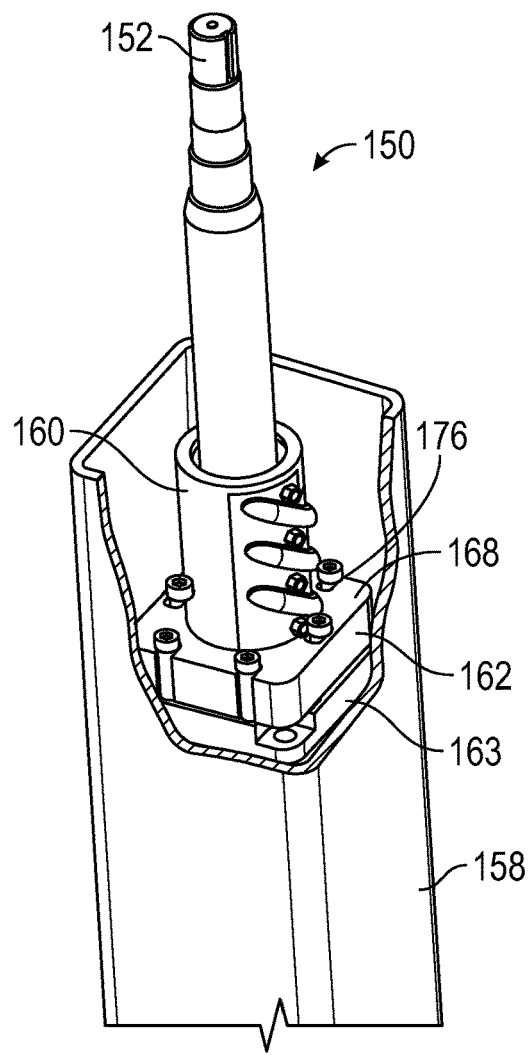
FIG. 3 is a perspective view of a ball screw actuator with one directional movement according to one aspect of the disclosure.
Figure 4:
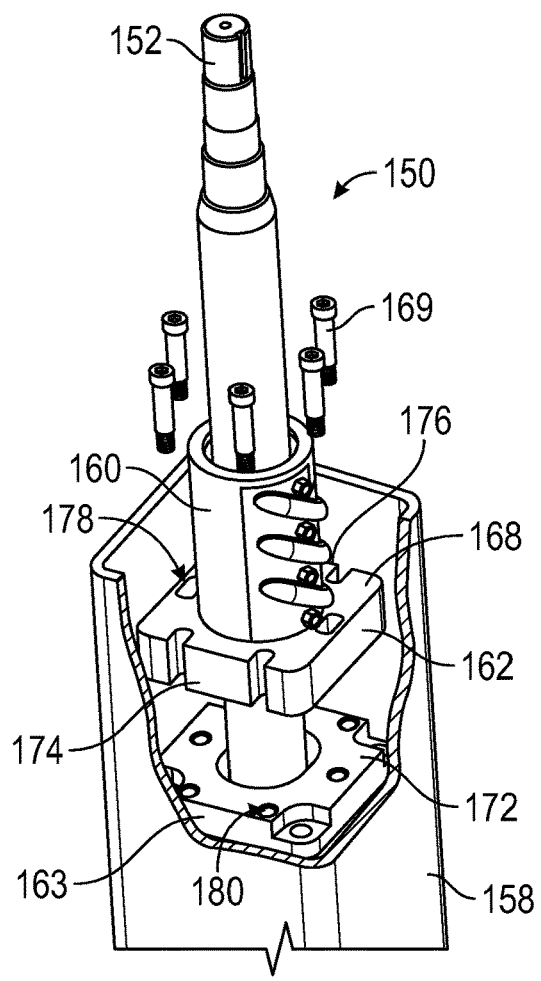
FIG. 4 is a perspective, partially disassembled view of the ball screw actuator of FIG. 3.

FIG. 2 illustrates a portion of a ball screw actuator 50 which may be used to selectively raise and lower the elevating structure 32 of the passenger boarding bridge 10 of FIG. 1. Although the embodiments of the ball screw actuator 50 illustrated in FIGS. 2-10 and described herein may benefit the elevating structure 32 to raise the passenger boarding bridge 10 of FIG. 1, it is to be understood that the embodiments described herein may be applied to numerous types of linear actuators in various industrial applications, such that the ball screw actuator 50 is not limited to the elevating structure 32. The passenger boarding bridge 10 is disclosed merely as an example of the type of application that the ball screw actuator 50 may be used with to accommodate misalignment of the system components. Generally, the ball screw actuator 50 may be used in any actuator application with a single directional load that has a light reversing load.

As shown in FIG. 2, a motor, such as the motor 38 of FIG. 1, is operatively coupled to a ball screw 52 with an output shaft. The output shaft of the motor 38 may be directly coupled to the ball screw 52 or may be indirectly coupled to the ball screw 52 via a gearbox. The motor 38 and the ball screw 52 are operatively coupled to an upper weldment structure 54 (or 36 in FIG. 1) that moves up and down, relative to a lower weldment structure 58. Therefore, the motor 38 and the ball screw 52 remain vertically stationary relative to the upper weldment structure 54 and travel vertically with the upper weldment structure 54. Although described herein as a weldment structure, it is to be appreciated that the structure may be a fully machined component, a cast component, an assembled unit with adhesives or fasteners, or the like may benefit from the embodiments disclosed herein. Therefore, all embodiments disclosed herein may be used with such structures.

A nut 60 is in threaded connection with the ball screw 52 and is fixed to a flange 62 that is mounted to the lower weldment structure 58. Rotation of the ball screw 52 results in translation of the nut 60 along the ball screw 52 due to the nut 60 being rotationally fixed. Movement of the nut 60 away from the motor 38 imparts a force that causes the upper weldment structure 54 to move upwardly, relative to the lower weldment structure 58 and the wheel 40, thereby raising the elevating structure 32 (FIG. 1) or 54 (FIG. 2).

As shown, the upper weldment structure 54 and the lower weldment structure 58 may be misaligned, relative to each other. In the embodiment of FIG. 2, the nut 60 is fixed to the flange 62 along a planar first, upper surface of the flange 62, and a planar second, lower surface of the flange 62 is mounted to a planar surface of the lower weldment structure 58. These rigid, substantially planar interfaces do not accommodate misalignment of the upper and lower weldment structures 54, 58. The free end of the ball screw 52 is more capable of flexing than regions of the ball screw 52 that are closer to the motor 38. Therefore, as the nut 60 travels along locations of the ball screw 52 that are closer to the motor 38, the ball screw 52 is less able to flex and binding of the assembly is likely to occur. Accordingly, the actuator assembly is susceptible to a shorter operability lifespan.

Referring now to FIGS. 3-6, the ball screw actuator is shown according to another embodiment, which is generally referenced with numeral 150, and accommodates the above-described misalignment issue. As shown, a motor, such as the motor 38 of FIG. 1, is operatively coupled to a ball screw 152 with an output shaft. The output shaft of the motor 38 may be directly coupled to the ball screw 152 or may be indirectly coupled to the ball screw 152 via a gearbox. The motor 38 and the ball screw 152 are operatively coupled to an upper weldment structure 154 that moves up and down, relative to a lower weldment structure 158. Therefore, the motor 38 and the ball screw 152 remain vertically stationary relative to the upper weldment structure 154 and travel vertically with the upper weldment structure 154.

A nut 160 is in threaded connection with the ball screw 152 and is fixed to a first flange 162 that is mounted to the lower weldment structure 158. In the illustrated embodiments, the first flange 162 is mounted to an adaptor plate 163 which is mounted to the lower weldment structure 158 in such a way to allow limited side to side movement in one direction, while preventing rotation motion and movement along the axis of the screw. Rotation of the ball screw 152 results in translation of the nut 160 along the ball screw 152 due to the nut 160 being rotationally fixed. Movement of the nut 160 away from the motor 38 imparts a force that causes the upper weldment structure 154 to move upwardly, relative to the lower weldment structure 158 and the wheel 40, thereby raising the elevating structure 32.

As described above and as shown, the upper weldment structure 154 and the lower weldment structure 158 may be misaligned, relative to each other. In the illustrated embodiments, the nut 160 is fixed to the first flange 162 along a first, upper surface 168 of the first flange 162, and a second, lower surface 170 of the first flange 162 is mounted to an upper surface 172 of the lower weldment structure 158, such as the upper surface of the adaptor plate 163. In contrast to the fixed, substantially planar interface of FIG. 2, the second surface 170 of the first flange 162 and the upper surface 172 of the adaptor plate 163 are non-planar to define an interface that allows the first flange 162 and the adaptor plate 163 to move relative to each other. The relative movement of these components accommodates misalignment of the upper and lower weldment structures 154, 158.

Figure 5:
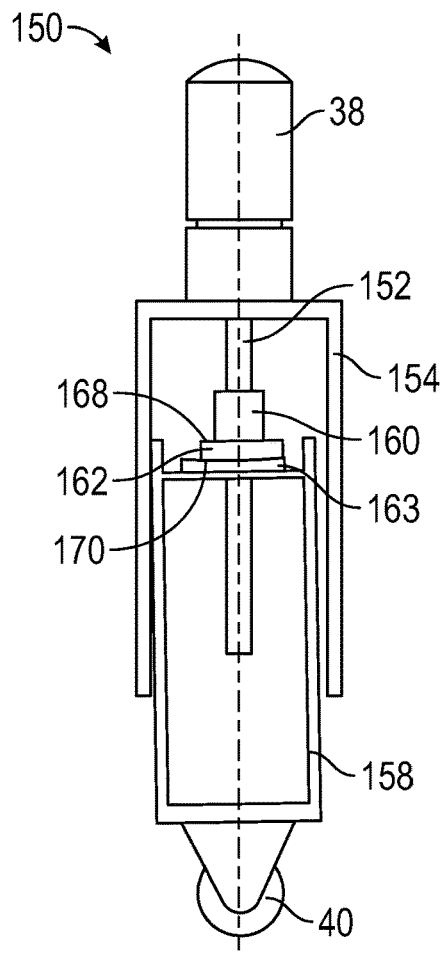
FIG. 5 is a side, elevation view of the ball screw actuator of FIG. 3 with an indented surface curvature.
Figure 6:
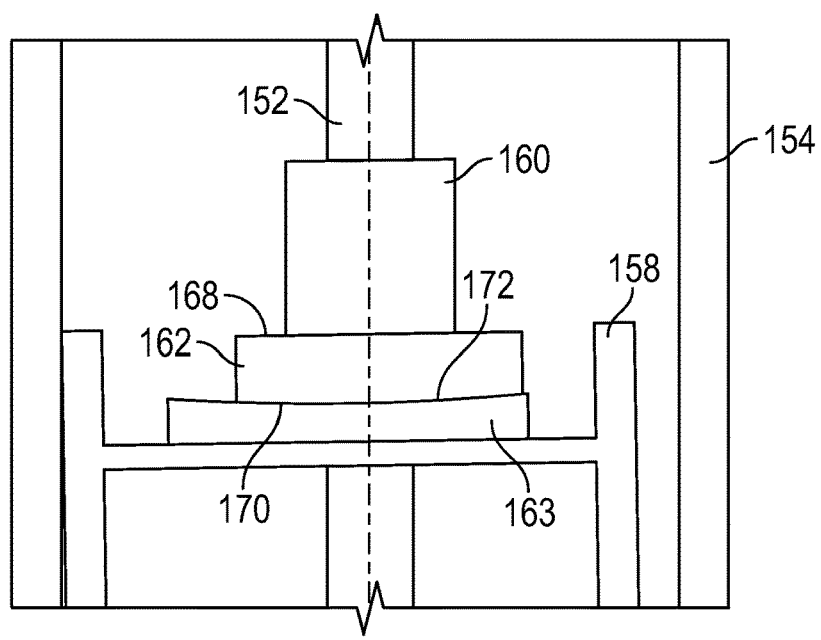
FIG. 6 is an enlarged view of a portion of FIG. 5, illustrating a curved flange.

The relative movement of the first flange 162 and the adaptor plate 163 is facilitated by the corresponding non-planar geometry of the first flange 162 and the adaptor plate 163, as shown well in the sectional view of FIGS. 5 and 6. In particular, the second surface 170 of the first flange 162 curves outwardly from a first side 174 of the first flange 162 to approximately a middle axis of the first flange 162. The second surface 170 then curves inwardly to a second side 176 of the first flange 162, the first and second sides 174, 176 being on opposite sides of the first flange 162. Therefore, the overall curvature of the second surface 170 is outwardly to define a radius of curvature about a first axis. The radius of curvature is not simply due to manufacturing variables and intolerances. Rather, the curvature is intended to facilitate continued travel of the nut 160 along the ball screw 152, while accommodating misalignment. In some embodiments, the radius of curvature of the second surface 170 is equal to or greater than a diameter of the ball screw 152.

Referring again to FIGS. 3 and 4, the structural connection of the first flange 162 and the lower weldment structure 158 is shown in detail. The structural connection couples the components, but also allows the above-described relative movement of the first flange 162 and the lower weldment structure 158. In particular, the first flange 162 defines a plurality of holes or apertures 178 which align with a plurality of holes or apertures 180 defined by the adaptor plate 163 mounted to the lower weldment structure 158. A plurality of fasteners 169 extend through each of the holes or apertures 178, 180 to fix the nut 160 and first flange 162 to the lower weldment structure 158, thereby preventing rotation of the nut 160. However, at least one of the holes or apertures 178 on the first side 174 of the first flange 162 is open to the side and is not a completely surrounded aperture. In other words, the open aperture(s) on the first side 174 is a recess that allows the corresponding mechanical fastener to at least partially exit the aperture during relative movement of the first flange 162 and the lower weldment structure 158. Similarly, at least one of the holes or apertures 178 on the second side 176 of the first flange 162 is open to the side and is not a completely surrounded aperture. This configuration allows relative sliding movement of the second surface 170 of the first flange 162 and the adaptor plate 163. Alternatively, rather than having the holes or apertures 178 open to the above-noted sides of the first flange, the holes or apertures 178 may be closed, such that they are not open to the sides. The holes or apertures 178 may be sized to accommodate relative movement of the first flange 162 and the lower weldment structure 158.

The above-described embodiment allows the ball screw 152 to push the nut 160 to the side, but the arc of the curved second surface 170 allows the nut 160 to align with the ball screw 152. The loading will be directed towards the center of the arc, thereby limiting side loading. This reduces or eliminates the amount of misalignment between the ball screw 152 and the nut 160.

Figure 7:
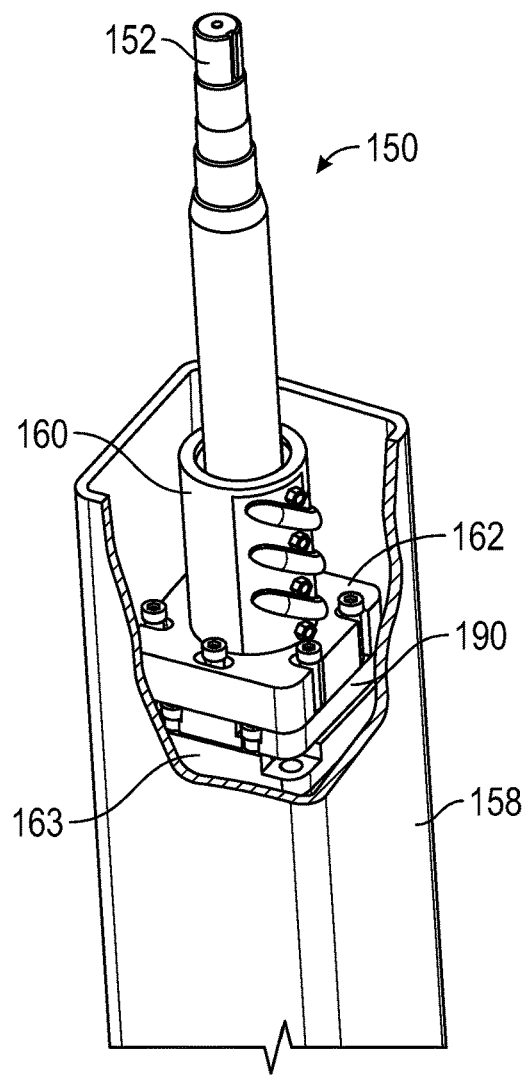
FIG. 7 is a perspective view of a ball screw actuator with two directional movement according to another aspect of the disclosure.
Figure 8:
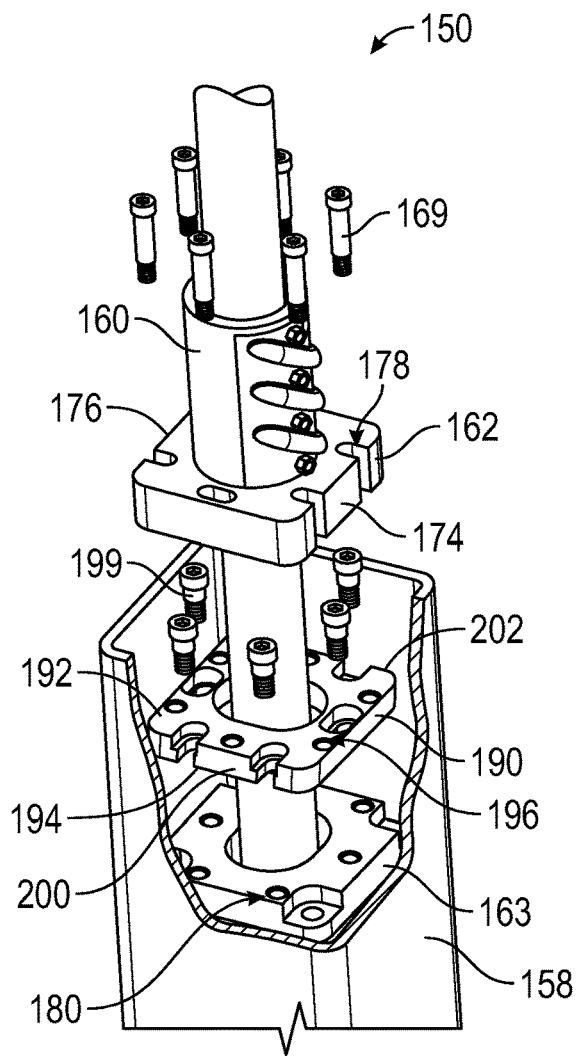
FIG. 8 is a perspective, partially disassembled view of the ball screw actuator of FIG. 7.

Referring now to FIGS. 7 and 8, another aspect of the disclosure is illustrated. In the illustrated embodiment, a spacer 190 is provided. The spacer 190 is disposed between the first flange 162 and the adaptor plate 163. Therefore, the outwardly curving second surface 170 of the first flange 162 is in contact with an inwardly curving third surface 192 of the spacer 190, and an outwardly curving fourth surface 194 of the spacer 190 is in contact with the surface of the adaptor plate 163. The direction of curvature of the fourth surface 194 is perpendicular to the direction of curvature of the second surface 170, thereby extending from a third side 200 to a fourth side 202. As with the first radius of curvature of the first flange 162, the fourth surface 194 has a radius of curvature (i.e., second radius of curvature) that is equal to or greater than a diameter of the ball screw 152. In other words, the axes of the respective radii of curvature are substantially perpendicular to each other. The curvature of the fourth surface 194 is substantially similar to the curvature described in detail above for the second surface, except for the 90 degree rotation. Therefore, the curvature is not described in duplicate here.

Like the first flange 162, the spacer 190 defines several holes or apertures 196. The holes or apertures 196 of the spacer 190 are separated into a first set and a second set. The first set is configured to receive the mechanical fasteners 169 that extend through the holes 178 of the first flange 162. This fixes the nut 160 and the first flange 162 to the spacer 190 in a manner that prevents relative rotation of the components. As discussed above, at least one of the holes or apertures 178 on the first side 174 of the first flange 162 is open to the side and is not a completely surrounded aperture. In other words, the open aperture(s) on the first side 174 is a recess that allows the corresponding mechanical fastener to at least partially exit the aperture during relative movement of the first flange 162 and the spacer 190. Similarly, at least one of the holes or apertures 178 on the second side 176 of the first flange 162 is open to the side and is not a completely surrounded aperture. This configuration allows relative sliding movement of the second surface 170 of the first flange 162 and the spacer 190.

A second group of fasteners 199 extends through the second set of holes or apertures 196 of the spacer 190 and into the threaded holes 180 in adaptor 163. However, at least one of the holes or apertures 196 on the third side 200 of the spacer 190 is open to the side and is not a completely surrounded aperture. In other words, the open aperture(s) on the third side 200 is a recess that allows the corresponding mechanical fastener to at least partially exit the aperture during relative movement of the spacer 190 and the adaptor plate 163. Similarly, at least one of the holes or apertures 196 on the fourth side 202 of the spacer 190 is open to the side and is not a completely surrounded aperture. This configuration allows relative sliding movement of the fourth surface 194 of the spacer 190 and the adaptor plate 163.

The embodiments of FIGS. 7 and 8 facilitate two directions of movement of the nut 160 relative to the ball screw 152, thereby providing greater misalignment correction capability.

Figure 9:
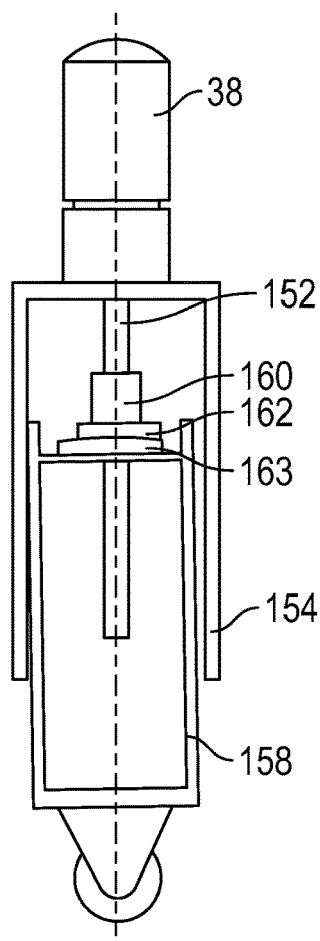
FIG. 9 is a side, elevation view of the ball screw actuator of FIG. 3 with protruding surface curvature.
Figure 10:
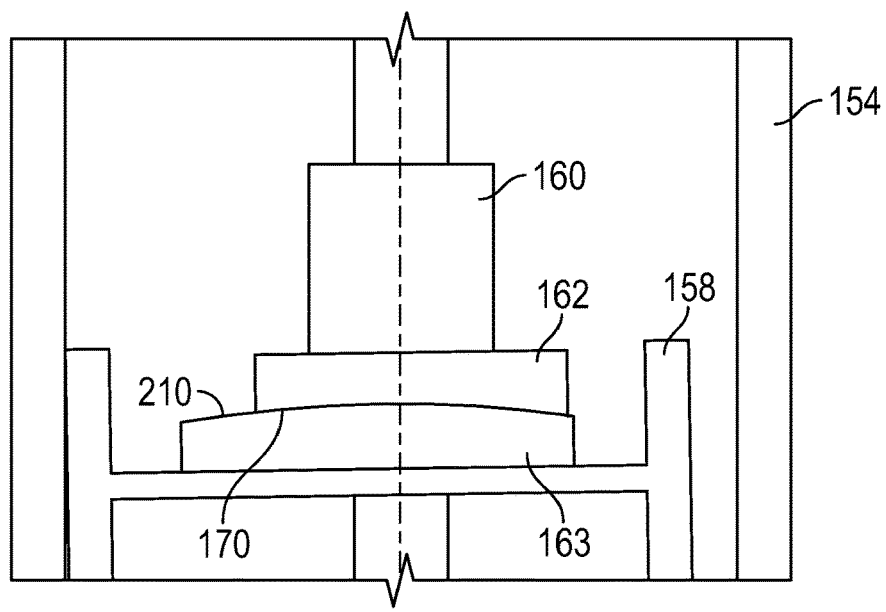
FIG. 10 is an enlarged view of a portion of FIG. 9, illustrating a curved flange.

Referring now to FIGS. 9 and 10, another aspect of the disclosure is illustrated. The overall assembly is similar to the embodiments of FIGS. 3-6 (i.e., single flange on spacer), but the second surface 170 of the flange 162 is a concave surface (i.e., radius of curvature is in the opposite direction to that of FIGS. 5 and 6). The concave surface is therefore curved to allow motion in all directions during relative movement of the flange 162 and the lower weldment structure 158 to reduce or eliminate misalignment of the nut 160 and the ball screw 152. The outwardly protruding surface 210 of the adaptor plate 163 corresponds to the geometry of the concave surface of the flange 162, thereby allowing the flange 162 to "ride" along the adaptor plate 163.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A linear actuator assembly comprising:
   a motor;
   a ball screw rotatably driven by the motor;
   a nut coupled to the ball screw and rotationally fixed, the nut translatable along the ball screw upon rotation of the ball screw; and
   a flange having a first surface and a second surface, the nut mounted to the first surface and the second surface having a non-planar geometry, the non-planar geometry defined by curvature about an axis from a first side of the flange to a second side of the flange, the first side and the second side of the flange being on opposite sides of the flange from each other, wherein the non-planar geometry of the second surface of the flange corresponds to a protruding curved surface of an adjacent component, the flange moveable along the protruding curved surface of the adjacent component.

2. The linear actuator assembly of claim 1, wherein the adjacent component defines a plurality of holes and the flange defines a plurality of apertures, the linear actuator assembly further comprising a plurality of mechanical fasteners extending through the plurality of apertures and the plurality of holes to rotationally fix the flange and the nut, relative to the adjacent component, wherein a first aperture of the plurality of apertures of the flange is open to the first side of the flange, and a second aperture of the plurality of apertures of the flange is open to the second side of the flange to accommodate movement of the flange relative to the adjacent component.

3. The linear actuator assembly of claim 1, wherein the adjacent component defines a plurality of holes and the flange defines a plurality of apertures, the linear actuator assembly further comprising a plurality of mechanical fasteners extending through the plurality of apertures and the plurality of holes to rotationally fix the flange and the nut, relative to the adjacent component, wherein a first aperture of the plurality of apertures of the flange are closed to the first side of the flange, and a second aperture of the plurality of apertures of the flange are closed to the second side of the flange to accommodate movement of the flange relative to the adjacent component.

4. The linear actuator assembly of claim 1, wherein a radius of curvature of the second surface of the flange is equal to or greater than a diameter of the ball screw.

5. The linear actuator assembly of claim 1, wherein the adjacent component is part of a lower weldment structure of an elevation structure for an aircraft passenger boarding bridge.

6. The linear actuator assembly of claim 5, wherein the motor and the ball screw are operatively coupled to an upper weldment structure of the aircraft passenger boarding bridge, wherein misalignment of the upper weldment structure and the lower weldment structure is accommodated by movement along the curvature of the second surface of the flange.

7. A linear actuator assembly comprising:
   a motor;
   a ball screw rotatably driven by the motor;
   a nut coupled to the ball screw and rotationally fixed, the nut translatable along the ball screw upon rotation of the ball screw;
   a first flange having a first surface and a second surface, the nut mounted to the first surface and the second surface having a radius of curvature about an first axis, the curvature of the second surface curving outwardly from a first side of the first flange to a second side of the first flange, the first side and the second side of the first flange being on opposite sides of the first flange from each other; and
   a spacer having a third surface and a fourth surface, the third surface having an inwardly curved surface corresponding to the second surface of the first flange, the fourth surface having an outwardly curved surface extending from a third side of the spacer to a fourth side of the spacer, the third side and the fourth side being on opposite sides of the spacer from each other.

8. The linear actuator assembly of claim 7, wherein the second surface of the first flange has a first radius of curvature about a first axis and the fourth surface of the spacer has a second radius of curvature about a second axis that is perpendicular to the first axis.

9. The linear actuator assembly of claim 8, wherein the first axis and the second axis are equal to or greater than a diameter of the ball screw.

10. The linear actuator assembly of claim 7, wherein the outwardly curved surface of the fourth surface of the spacer corresponds to a protruding curved surface of an adjacent component, the spacer moveable along the protruding curved surface of the adjacent component.

11. The linear actuator assembly of claim 10, wherein the second surface of the first flange is moveable along the third surface of the spacer.

12. The linear actuator assembly of claim 9, wherein the first flange defines a plurality of holes and the spacer defines a first set of apertures, the linear actuator assembly further comprising a first plurality of mechanical fasteners extending through the plurality of holes of the first flange and the first set of apertures of the spacer to rotationally fix the first flange and the nut, relative to the spacer, wherein a first hole of the plurality of holes of the first flange is open to the first side of the first flange, and a second hole of the plurality of apertures of the first flange is open to the second side of the first flange to accommodate movement of the first flange relative to the spacer.

13. The linear actuator assembly of claim 12, wherein the adjacent component defines a plurality of apertures and the spacer defines a second set of apertures, the linear actuator assembly further comprising a second plurality of mechanical fasteners extending through the second set of apertures and the plurality of apertures of the adjacent component, wherein a first aperture of the second set of apertures of the spacer is open to the third side of the spacer, and a second aperture of the second set of apertures of the spacer is open to the fourth side of the spacer to accommodate movement of the spacer relative to the adjacent component.

14. The linear actuator assembly of claim 10, wherein the adjacent component is part of a lower weldment structure of an elevation structure for an aircraft passenger boarding bridge.

15. The linear actuator assembly of claim 14, wherein the motor and the ball screw are operatively coupled to an upper weldment structure of the aircraft passenger boarding bridge, wherein misalignment of the upper weldment structure and the lower weldment structure is accommodated by movement along the curvature of the second surface of the first flange and movement along the curvature of the fourth surface of the spacer.

* * * * *